(12) United States Patent
Apted

(10) Patent No.: US 9,013,509 B2
(45) Date of Patent: Apr. 21, 2015

(54) SYSTEM AND METHOD FOR MANIPULATING DIGITAL IMAGES ON A COMPUTER DISPLAY

(75) Inventor: Trent Apted, Kingsford (AU)

(73) Assignee: Smart Internet Technology CRC Pty Ltd, Eveleigh NSW (AU)

( * ) Notice: Subject to any disclaimer, the term of this patent is extended or adjusted under 35 U.S.C. 154(b) by 796 days.

(21) Appl. No.: 12/677,767

(22) PCT Filed: Sep. 11, 2008

(86) PCT No.: PCT/AU2008/001345
§ 371 (c)(1),
(2), (4) Date: Jun. 2, 2010

(87) PCT Pub. No.: WO2009/033219
PCT Pub. Date: Mar. 19, 2009

(65) Prior Publication Data
US 2010/0271398 A1 Oct. 28, 2010

(30) Foreign Application Priority Data
Sep. 11, 2007 (AU) .................. 2007904927

(51) Int. Cl.
*G09G 5/00* (2006.01)
*G06F 3/0484* (2013.01)
*G06F 3/0488* (2013.01)

(52) U.S. Cl.
CPC ........ *G06F 3/04845* (2013.01); *G06F 3/04883* (2013.01); *G06F 2203/04802* (2013.01)

(58) Field of Classification Search
USPC .......................................... 345/619, 650, 633
See application file for complete search history.

(56) References Cited

U.S. PATENT DOCUMENTS

| | | |
|---|---|---|
| 5,016,194 A | 5/1991 | Matsushita et al. |
| 5,241,625 A | 8/1993 | Epard |
| 5,341,466 A | 8/1994 | Perlin |
| 5,801,699 A | 9/1998 | Hocker |
| 5,801,700 A | 9/1998 | Ferguson |
| 5,874,962 A | 2/1999 | de Judicibus |

(Continued)

FOREIGN PATENT DOCUMENTS

| | | |
|---|---|---|
| AU | 2003285781 | 7/2004 |
| AU | 20040304946 | 7/2005 |

(Continued)

OTHER PUBLICATIONS

Otmar Hilliges et al., Photohelix: Browsing, Sorting and Sharing Digital Photo Collections, Horizontal Interactive Human-Computer Systems, Tabletop '07, Second Annual IEEE International Workshop, Oct. 2007, pp. 87-94.

(Continued)

*Primary Examiner* — M Good Johnson
(74) *Attorney, Agent, or Firm* — Workman Nydegger

(57) ABSTRACT

The present invention provides a user interface for manipulating digital images. The interface includes a display arranged to display at least one digital image. The at least one image has a front side and at least one opposing side displayable to a user, the front and each one of the opposing sides having at least one detection portion. The detection portion is arranged to detect a manipulation request by the user and, on detection of the request, initiate a routine whereby a displayed side is rotated from view and at least one opposing side is displayed.

34 Claims, 4 Drawing Sheets

(56) References Cited

U.S. PATENT DOCUMENTS

| | | | |
|---|---|---|---|
| 5,877,762 A | 3/1999 | Young | |
| 5,887,081 A | 3/1999 | Bantum | |
| 5,977,974 A | 11/1999 | Hatori | |
| 6,011,537 A | 1/2000 | Slotznick | |
| 6,133,914 A | 10/2000 | Rogers | |
| 6,408,301 B1 | 6/2002 | Patton | |
| 6,414,672 B2 | 7/2002 | Rekimoto | |
| 6,510,553 B1 | 1/2003 | Hazra | |
| 6,542,192 B2 | 4/2003 | Akiyama | |
| 6,590,593 B1 | 7/2003 | Robertson | |
| 6,727,906 B2 | 4/2004 | Lockeridge | |
| 6,819,267 B1 | 11/2004 | Edmark | |
| 6,880,132 B2* | 4/2005 | Uemura | 715/848 |
| 6,978,472 B1 | 12/2005 | Nashida | |
| 7,065,716 B1 | 6/2006 | Rzepkowski | |
| 7,102,639 B2 | 9/2006 | Oka | |
| 7,168,813 B2* | 1/2007 | Wong et al. | 353/120 |
| 7,197,535 B2 | 3/2007 | Salesky | |
| 7,249,327 B2 | 7/2007 | Nelson et al. | |
| 20080/065996 | 3/2008 | Noel et al. | |
| 7,394,459 B2* | 7/2008 | Bathiche et al. | 345/175 |
| 7,395,515 B2 | 7/2008 | Konar | |
| 7,480,873 B2* | 1/2009 | Kawahara | 715/848 |
| 7,519,223 B2 | 4/2009 | Dehlin | |
| 7,535,463 B2 | 5/2009 | Wilson | |
| 7,706,634 B2 | 4/2010 | Schmitt | |
| 7,907,128 B2 | 3/2011 | Bathiche | |
| 8,018,579 B1* | 9/2011 | Krah | 356/4.01 |
| 8,111,239 B2* | 2/2012 | Pryor et al. | 345/156 |
| 8,230,359 B2 | 7/2012 | Robertson | |
| 8,677,284 B2* | 3/2014 | Aguilar | 715/863 |
| 2002/0033849 A1 | 3/2002 | Loppini | |
| 2002/0051063 A1 | 5/2002 | Hwang | |
| 2003/0093466 A1 | 5/2003 | Jarman et al. | |
| 2004/0070608 A1* | 4/2004 | Saka | 345/748 |
| 2004/0150646 A1 | 8/2004 | Oka | |
| 2005/0052427 A1 | 3/2005 | Wu et al. | |
| 2005/0132299 A1 | 6/2005 | Jones et al. | |
| 2005/0140696 A1* | 6/2005 | Buxton | 345/660 |
| 2005/0280631 A1* | 12/2005 | Wong et al. | 345/158 |
| 2006/0002315 A1 | 1/2006 | Thuerer | |
| 2006/0010392 A1 | 1/2006 | Noel et al. | |
| 2006/0010400 A1* | 1/2006 | Dehlin et al. | 715/856 |
| 2006/0023078 A1 | 2/2006 | Schmitt | |
| 2006/0031786 A1 | 2/2006 | Hillis | |
| 2006/0125799 A1 | 6/2006 | Hillis et al. | |
| 2006/0136828 A1 | 6/2006 | Asano | |
| 2006/0140508 A1 | 6/2006 | Ohgishi | |
| 2006/0241864 A1 | 10/2006 | Rosenberg | |
| 2006/0253797 A1 | 11/2006 | Madan | |
| 2006/0274046 A1 | 12/2006 | Hillis et al. | |
| 2007/0014460 A1 | 1/2007 | Kuziela et al. | |
| 2007/0046643 A1 | 3/2007 | Hillis et al. | |
| 2007/0146347 A1 | 6/2007 | Rosenberg | |
| 2007/0157101 A1 | 7/2007 | Indiran | |
| 2007/0234226 A1 | 10/2007 | Szeto | |
| 2008/0024444 A1 | 1/2008 | Abe | |
| 2008/0222540 A1 | 9/2008 | Schulz | |
| 2008/0229222 A1 | 9/2008 | Kake | |
| 2009/0100343 A1 | 4/2009 | Lee | |
| 2009/0122018 A1 | 5/2009 | Vymenets et al. | |
| 2010/0241979 A1 | 9/2010 | Apted | |
| 2010/0281395 A1 | 11/2010 | Apted | |
| 2010/0295869 A1 | 11/2010 | Apted | |
| 2011/0239129 A1 | 9/2011 | Kummerfield | |
| 2012/0143991 A1 | 6/2012 | Collins | |

FOREIGN PATENT DOCUMENTS

| | | |
|---|---|---|
| AU | 2008299577 | 5/2012 |
| AU | 2008299576 | 6/2012 |
| AU | 2008299579 | 6/2012 |
| CA | 2548724 | 7/2005 |
| DE | 10353785 | 6/2005 |
| DE | 102006012976 | 7/2007 |
| EP | 0235902 | 7/1991 |
| EP | 0572228 | 12/1993 |
| EP | 0368664 | 6/1995 |
| EP | 1573678 | 9/2005 |
| EP | 1685384 | 8/2006 |
| EP | 1695195 | 8/2006 |
| EP | 1913574 | 4/2008 |
| EP | 1952221 | 8/2008 |
| GB | 2347834 | 9/2000 |
| JP | 62219179 | 9/1987 |
| JP | 2130164 | 5/1990 |
| JP | H11-345060 | 2/1998 |
| JP | EP0853426 | 7/1998 |
| JP | 2004-078488 | 8/2002 |
| JP | 2010-524306 | 10/2002 |
| JP | 2002-140147 | 2/2003 |
| JP | 2004213641 | 7/2004 |
| JP | 2005100391 | 4/2005 |
| JP | 2006-172193 | 6/2006 |
| JP | 2006172193 | 6/2006 |
| JP | 2010-524307 | 9/2008 |
| JP | 2010-524305 | 8/2012 |
| WO | WO9306691 | 4/1993 |
| WO | WO2004057540 | 7/2004 |
| WO | WO2005050175 | 6/2005 |
| WO | WO2005060544 | 7/2005 |
| WO | WO2006017695 | 2/2006 |
| WO | WO2007014082 | 2/2007 |
| WO | WO2007061839 | 5/2007 |
| WO | WO2009033216 | 3/2009 |
| WO | WO2009033217 | 3/2009 |
| WO | WO2009033218 | 3/2009 |

OTHER PUBLICATIONS

Office Action for Corresponding Australian Application No. 20085299576 dated Jun. 12, 2012.

Office Action for Corresponding Japanese Application No. 2010-52305 dated Aug. 28, 2012.

Office Action for Corresponding Australian Application No. 2008299577 dated May 23, 2012.

Office Action for Corresponding Japanese Application No. 2010-524306 dated Oct. 2, 2012.

Meyer, Fernand "An Overview of Morphological Segmentation" *International Journal of Pattern Recognition and Artificial Intelligence*, Nov. 1, 2001 Vo. 15, No. 7, pp. 1089-1118.

Office Action for Corresponding Japanese Application 2010-524307 dated Feb. 5, 2013.

Office Action for Corresponding European Application 08799989.2 dated Jan. 7, 2013.

Office Actionfor Corresponding European Application 08799989.2 dated Oct. 27, 2011.

Office Actionfor Corresponding Australian Application 2008299578 dated Feb. 28, 2013.

U.S. Appl. No. 12/677,760, Oct. 11, 2012, Final Office Action.
U.S. Appl. No. 12/677,765, Dec. 5, 2012, Office Action.
U.S. Appl. No. 12/677,756, May 9, 2013, Final Office Action.
U.S. Appl. No. 12/677,760, May 24, 2013, Office Action.

Jingyu Cui et al., "Easy Album: An Interactive Photo Annotation System Based Annotation System Based on Face Clustering and Re-ranking, Conference on Human Factors in Computing Systems Archive", Proceedings of SIGCHI Conference on Human Factors in Computing Systems, CHI 2007, Apr. 28-May 3, 2007, San Jose, CA, USA.

Techsmith: "SnagIt User's Guide, Capture and Share Anything on Your Screen" Internet Citation 2003, XP 002354973, retrieved from the Internet: URL: ftp://ftp.techsmith.com/Pub/products/snagit/63/snagitug.pdf, retrieved Nov. 18, 2005.

Everitt K et al.: "MultiSpace: Enabling Electronic Document Micromobility in Table-Centric, Multi-Device Environments", Horizontal Interactive Human-Computer Systems, 2006. TableTop 2006. First IEEE International Workshop on Adelaide, South Australia Jan. 5-7, 2006, Piscataway, NJ, USA, IEEE, Jan. 5, 2006, pp. 27-34, ISBN: 978-0-7695-2494-8.

(56) References Cited

OTHER PUBLICATIONS

Scott S D et al: "Storage Bins: Mobile Storage for Collaborative Tabletop Displays", IEEE Computer Graphics and Applications, IEEE Service Center, New York, NY, US, vol. 25, No. 4, Jul. 1, 2005 pp. 58-65, ISSN: 0272-1716.
International Search Report cited in International Application No. PCT/AU2010/0008323 dated Aug. 23, 2010.
Montferrat, P., Apostolopoulou, A., Besacier, G., Buisine, S., Rey, G., Vernier, F. (2007). Brainstorming and mind-mapping on DiamondTouch: Creativity unleashed. (1 page) (the month of Publication is irrelevant as the year of Publication is clearly prior to the filing of the Application).
Hilliges, Otmar "Designing for Collaborative Creative Problem Solving" Jun. 13-15, 2007, Washington DC, USA (10 pages).
Christensen, Brett, "Relocate theWindows Taskbar," May 6, 2006, Available http://web.archive.org/web/20060506163826/http://www.sp-tips.com/relocate-taskbar.html.
Hilliges, Otmar, Banr, Dominikus, Butz, Andreas "Photohelix:Browsing, Sorting and Sharing Digital Photo Collections" 9 pages, Oct. 2007; Media Informatics Group, University of Munich, Germany.
U.S. Appl. No. 12/677,760, Feb. 9, 2012, Office Action.
U.S. Appl. No. 12/677,756, Sep. 14, 2012 Office Action.
Extended European Search Report from PCT/AU2008/001343 completed Sep. 13, 2013.
U.S. Appl. No. 12/677,760, Nov. 27, 2013, Final Office Action.
U.S. Appl. No. 12/677,756 Dec. 26, 2013, Notice of Allowance.
Office Action for Corresponding Japanese Application 2010-524305 dated Sep. 10, 2013.
Extended European Search Report for PCT/AU2008/001344 dated Nov. 8, 2010.
U.S. Appl. No. 12/677,765, Aug. 29, 2013, Final Office Action.
U.S. Appl. No. 12/677,765, Apr. 10, 2014, Office Action.
Office Action for Corresponding European Application 08799988.4 dated Jul. 18, 2012.
Office Action for Corresponding Australian Application 2008299576 dated Mar. 6, 2014.
International Search Report for PCT/AU2008/001342 dated Nov. 19, 2008.
International Search Report for PCT/AU2008/001345 dated Nov. 21, 2008.
International Search Report for PCT/AU2008/001344 dated Nov. 5, 2008.
International Search Report for PCT/AU2008/001343 dated Oct. 24, 2008.
U.S. Appl. No. 12/677,765, Oct. 1, 2014, Notice of Allowance.
U.S. Appl. No. 12/677,760, Nov. 19, 2014, Office Action.

\* cited by examiner

SYSTEM AND METHOD FOR MANIPULATING DIGITAL IMAGES ON A COMPUTER DISPLAY

TECHNICAL FIELD

The present invention relates to a system and method for manipulating digital images on a display of a computing device.

BACKGROUND OF THE INVENTION

Computer users often find the process of inputting and manipulating computer data to be tedious and difficult. One reason for this is that computer interfaces are very artificial and require complex operations to achieve a desired outcome.

Most computer users will, over time, become familiar with any interface. However, there remain those users who experience difficulty irrespective of how much interaction they have with the interface. For example, computer users who have had little training with computers, or those who access their computer infrequently, can find it difficult to remember what input is required to have the computer perform a desired task. This is particularly the case with manipulating objects such digital images which are displayed on the computer screen. Digital images often have many layers of abstraction, requiring the user to work with many layers and be very coordinated and precise with the computer interface in order to manipulate the image accurately and correctly.

SUMMARY OF THE INVENTION

In a first aspect the present invention provides a user interface for manipulating digital images comprising a display arranged to display at least one digital image, the at least one image having a front side and at least one opposing side displayable to a user, the front and each one of the opposing sides having at least one detection portion, wherein the detection portion is arranged to detect a manipulation request by the user and, on detection of the request, initiate a routine whereby a displayed side is rotated from view and at least one opposing side is displayed.

In an embodiment of a user interface the detection portion is a defined segment of one of the front and each one of the opposing sides.

In an embodiment of a user interface the rotation occurs only if the manipulation request is sustained by the user during the execution of the routine.

In an embodiment, the routine provides feedback to the user during the execution of the routine.

In an embodiment, the feedback is an animation of the rotation of the image.

In an embodiment, the animation depicts the rotation of the image on an axis that is perpendicular to the surface In an embodiment, the manipulation request is one of a hand gesture and a movement of a stylus, pen or electronic peripheral.

In an embodiment, the manipulation request comprises a user input including one of a hand gesture, movement of a stylus, pen and electronic peripheral input to the user interface.

In an embodiment the manipulation request is a rotation movement performed by the user input.

In an embodiment each one of the opposing sides may display a representation of a digital object.

In an embodiment the digital object is an audio file.

In an embodiment the representation is an icon associated with the digital object.

In accordance with a second aspect the present invention provides a method for manipulating digital images comprising: the steps of displaying at least one digital image on a display, rendering the at least one image to have a front side and at least one opposing side, displaying the front side on the display, placing at least one detection portion on the front and each one of the opposing sides, detecting a manipulation request by the user with the detection portion and, on detection of the request, initiate a routine whereby a displayed side is rotated from view and at least one opposing side is displayed.

In accordance with a third aspect the present invention provides a system for manipulating digital images comprising a computer unit, the computer unit having an interface according to the first aspect.

In accordance with a fourth aspect the present invention provides a computer program comprising at least one instruction for controlling a computer system to implement a user interface according to the first aspect.

In accordance with a fifth aspect the present invention provides a computer program comprising at least one instruction for controlling a computer system to implement a method according to the second aspect.

In accordance with a sixth aspect the present invention provides a computer readable medium providing a computer program in accordance with any one of the fourth or fifth aspects.

BRIEF DESCRIPTION OF THE DRAWINGS

Notwithstanding any other forms which may fall within the scope of the present invention, a preferred embodiment will now be described, by way of example only, with reference to the accompanying drawings in which.

DETAILED DESCRIPTION

Figure 1:
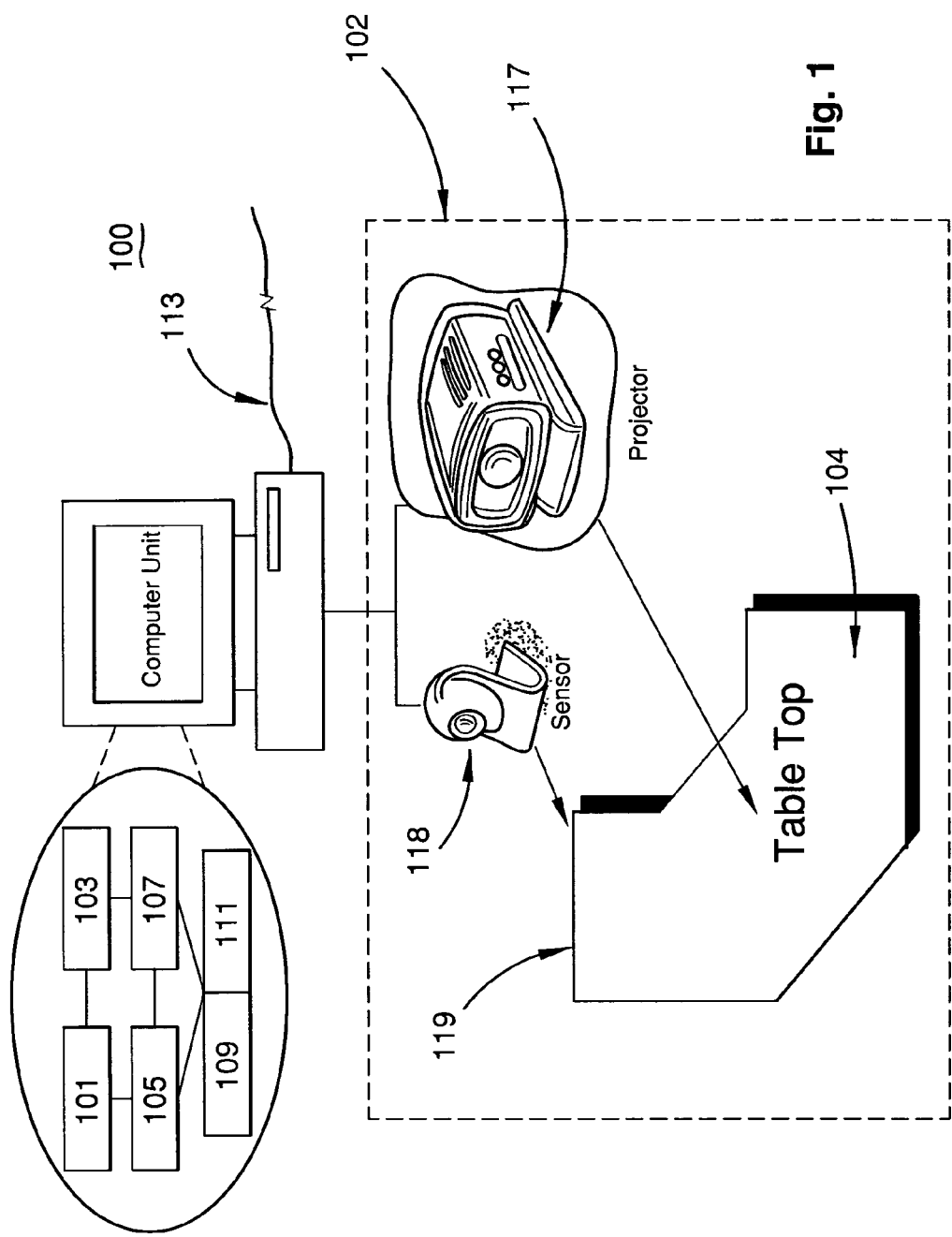
FIG. 1 is a schematic of a computer system utilised to implement an embodiment of the present invention.

With reference to FIG. 1, there is shown a computing system 100 arranged to implement a method in accordance with an embodiment of the present invention. The system 100 is in the form of a personal computer (hereafter "tabletop computer") including a surface-mount display 102. The display 102 is arranged to display a user interface 104 and receive user input for manipulating digital images and other information displayed thereon. The digital images have a front side and at least one opposing side displayable to a user of the tabletop computer 100. The front and opposing sides have at least one detection portion which is arranged to detect a manipulation request by the user. On detection of the request, the tabletop computer 100 initiates a routine whereby a currently displayed side of the image is rotated from view and at least one opposing side is displayed.

To achieve the aforementioned functionality, the tabletop computer 100 comprises computer hardware including a motherboard 101, central processing unit 103, read only memory (ROM) 105, random access memory (RAM) 107, and input/output devices such as disk drives 109, Ethernet ports 111, etc. There may also be provided a plurality of communication links 113 which connect to one or more other computing devices, such as servers, personal computers, terminals, wireless or handheld computing devices etc. At least one of the plurality of communications links may be connected to an external computing network through a telephone line or other type of communications link.

The tabletop computer 100 also includes a display 102 including a projector 117 connected to the tabletop computer 100. The projector 117 projects the user interface 104 onto a surface 119. The display 102 also includes a sensor 118 capable of detecting a user input for manipulating objects displayed on the user interface 104. In an embodiment, the user input may comprise hand movements (or gestures) and/or input from a stylus or pen. In addition to the hardware, the tabletop computer 100 includes an operating system (such as the Microsoft Windows™ XP operating system, which is provided by Microsoft Corporation) that resides on the hard disk and which co-operates with the hardware to provide an environment in which the software applications can be executed. In this regard, the tabletop computer 100 is loaded with a detection module which detects manipulation requests input by a user.

In the embodiment described herein, the digital image is in the form of a digital photograph having two displayable sides, akin to a physical photograph. Manipulation requests include, among others, requests to move or drag the image from one part of the user interface 104 to another, as well as requests to "flip" the digital image so that another side of the image may be presented to the user. To carry out a flipping action, there is provided a flipping module which co-operates with the user interface 104 and the sensor 118. Responsive to receiving a flipping request, the flipping module carries out an animation process whereby the digital image is animated on the display as if it were rotated from one view such that the displayed view is hidden and the opposing side of the digital image is displayed. This rotation may be on an axis perpendicular to any straight edge of the digital image, or it may be a rotation that may be a combination on both the perpendicular and parallel axis to any straight edge of the digital image. This rotation provides a visual effect akin to a physical card, photo or object being turned over by hand. An attachment module is also provided by the tabletop computer 100 which allows data objects, including, but not limited to files such as audio or text files, or other digital data to be associated with the flipped side of the digital image. In such an embodiment, the user can, for example, attach a media file to the digital image which can be executed once the image has been flipped. This functionality provides the user with a familiar experience as it allows the user to virtually flip an image, using the same action and skill as would be required to interact with physical objects.

Figure 2A:
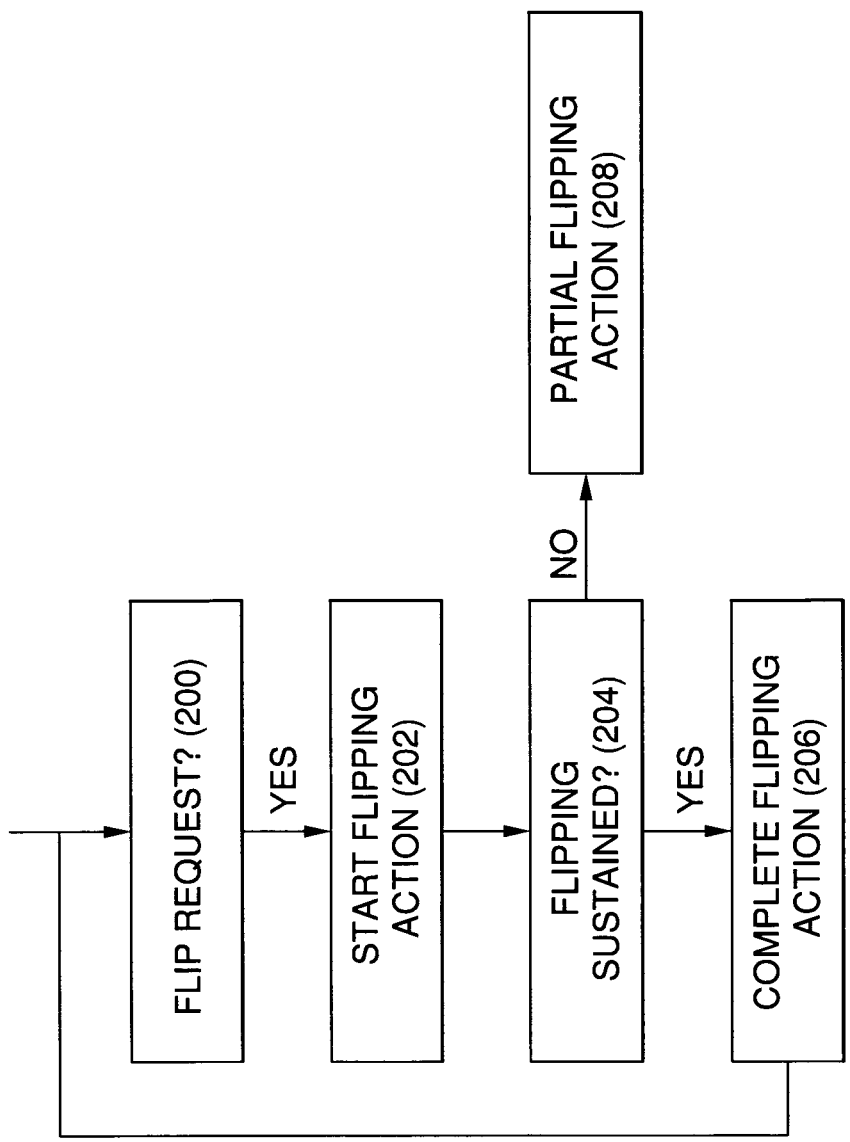
FIGS. 2a and 2b are flow diagrams showing method steps for flipping and attaching objects to a digital image, in accordance with an embodiment of the present interface.

Referring to FIG. 2a, there is provided a flow chart which outlines a methodology in accordance with an embodiment of the present invention. At step 200, the software application in accordance with an embodiment of the invention detects (periodically) the presence of a flip request. If a flip request is detected, step 202 is invoked and a flipping action is initiated. Once the flipping action at step 202 has been initiated, a determination is made as to whether the flipping action is sustained (step 204). If the flipping action is sustained, step 206 is invoked and the flipping action is completed. After the flipping action is completed, the method returns to awaiting the next flip request (step 200).

Conversely, if the flipping action is not sustained, the methodology progresses to step 208 where a partial flipping action is initiated. Once the partial flipping action is completed, the methodology returns to step 200, namely awaiting a flip request.

In more detail, the detection module detects a user input request to flip the digital image. The flip request is provided by the user in the form of a hand movement and/or the movement of a stylus, pen or other electronic peripheral device. To detect a flip request, the detection module determines the location of user input touch points received on the user interface 104 by monitoring for such touch points with the sensor 118. The touch points are calculated by determining absolute values of the components of the image coordinates of the touch points. If the detection module determines that one or more touch points are located in the prescribed detection portions (also referred to as "hot spots"), the determination module instructs the flipping module to initiate the flipping action.

The hot spots are configurable based on user behaviour or hardware configuration. In an embodiment, the hot spots include both the top-left corner and bottom-right corner of the digital image. To instruct a flipping action, the user simultaneously touches the hot spots using their thumb and middle finger, and carries out a pinching action such that the thumb and middle finger are brought together. In this manner, the user input is effectively the same action as the action that the user would perform to flip a physical photograph. A similar movement may also be performed by using a stylus or pen, where the user first touches a hot spot using the stylus, and without lifting the stylus, moves the stylus towards the other hot spot, thereby simulating the flipping hand gesture. As a way of illustrating an implementation of this embodiment, without limitation, a listing of code for one method of implementation is provided in Annexure 1.

Still referring to FIG. 2a, the flipping module receives the arguments of pixel coordination (x,y) on the user interface 104 corresponding to the control point used for the flip action 202 and the coordinates are converted using the cached inverse transformation matrices used to position the object being flipped in the virtual environment. The x coordinate is normalised to make it comparable with the y coordinate so as to give equal weighting to determine the initial direction of the flip. As a way of illustrating an implementation of this embodiment, without limitation, a listing of code for one method of implementation is provided in Annexure 2.

The direction of the flip is determined by the location of the initial control point of the digital image. As discussed earlier, each control point has a pixel coordination (x,y). In determining the direction of flip, if the user only touches one control point the absolute values of each x and y components are considered, and the largest component (i.e. the component with the largest distance from the centre of the image) determines the direction of the flip. In the case where the user touches a plurality of points on the digital image, the average of all coordinates of the control points is first calculated and the resultant coordinate is utilised to determine the largest component and therefore the direction of flip. The distance to flip is twice the position component (as points initially extend from −0.5 to 0.5), so the distance lies in the range [−1.0, 1.0]. The angle to flip is the arccosine of the distance. The module maintains the state to continue a flip in the same direction once initiated, and to determine whether the module is flipping to the reverse side, or back to the "front" side. The flipping of the image itself occurs in the draw procedure and this communicates with the user interface to animate the flipping process. Unlike traditional computer user interfaces, whereby the feedback is lacking, delayed, unrealistic or non existent, this function allows a feedback to be provided to the user thereby enhancing the user's experience in using the interface. In other words, the provision of feedback by detecting the direction of flipping or the cancellation of a flip assists in further teaching the user in using the interface by providing real time feedback for the user, much like the user's physical interaction with a real life environment. As a way of illustrating an implementation of this embodiment, without limitations, a listing of code for one method of implementation is provided in Annexure 3.

Figure 2B:
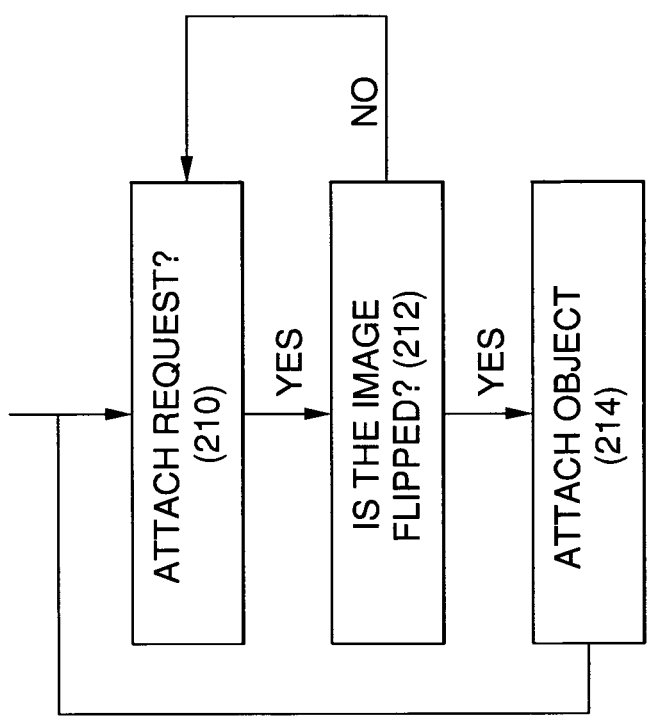

Referring now to FIG. 2b, there is described a methodology which an object may be attached to the "back" (i.e. other side) of a flipped image. At step 210, a determination is made as to whether a user has initiated an attachment request. If an attachment request is initiated, the system proceeds to determine whether the image has been flipped (step 212). If the image has been flipped, the object is attached (step 214). Thereafter, the methodology returns to the periodic determination of whether an attachment request has been initiated.

Conversely, if the image is not flipped, an attachment cannot be made to the object and the methodology returns to step 210, namely a periodic determination of whether a new attachment request has been made.

In more detail, whenever a digital object is moved on the user interface 104, a checklink function selects the object directly below the touch point on the object being moved. If there is a digital image present and the image has been flipped by the flip module, then an attachment occurs between the digital data and the image. Once the digital objects are attached or released from an attachment, the objects are subject to a layout algorithm. Two example layout algorithms are a "FlowLayout" and "Space-Filling Thumbnails" layout, but potentially any layout can be used including a "Stacked Layout" which stacks objects of the same "type" in a pile. This embodiment further enhances the user's experience with the user interface 104 as it allows the user to actively add attachments such as messages, information, clips, descriptions or other items to the images. The attachments are easily accessible, removable and manageable even for those without computing skills, as the graphical display and the structure of the presentation in the embodiment provides an easy file management of the objects. Upon the addition or removal of any attachments, the user can simply "flip" the image over again and thereby allow for easy storage or filing. The entire process of image flipping, object attachment and filing is, on traditional computer interface, a difficult and cumbersome task. However in this presently described embodiment, the entire process can be achieved with normal intuitive actions that a normal user, (particularly a user unfamiliar with computers) would be able to complete with little training. As a way of illustrating an implementation of the embodiment, without limitation, a listing of code for one method of implementation is provided in Annexure 4.

EXAMPLE

With reference to FIGS. 3A to 3D, a user chooses the image 300 that they wish to manipulate. The user may then touch the digital image 300 projected onto the table as if the user were manipulating a real object. The user may bring the digital image closer or further away, and move the image to any new position on the user interface 102.

To flip the digital image 300, the user simulates a flipping gesture (as described above) over the digital image 300 using the prescribed areas 302. In an embodiment, this is achieved by the user placing two fingers on the image, one each in adjacent photo corners. The user than drags two fingers across the image to flip it, in one embodiment, a "corner" triangle is rendered on the edges of the digital image and a user's finger or stylus or pen when placed in a "corner" triangle will begin a flip action, and as it is dragged over the image, the image is seen to rotate on a horizontal axis, perpendicular to the straight line joining the two edges. If the flipping movement from the user is withdrawn less than half way during the flipping of the image, the image will return to its previous state as the flipping movement is cancelled. During the flipping action, the image 300 may be displayed as an animation of a simulated turning movement as if they were physical photographs placed on a table (see FIGS. 3B & 3C).

Figure 3B:
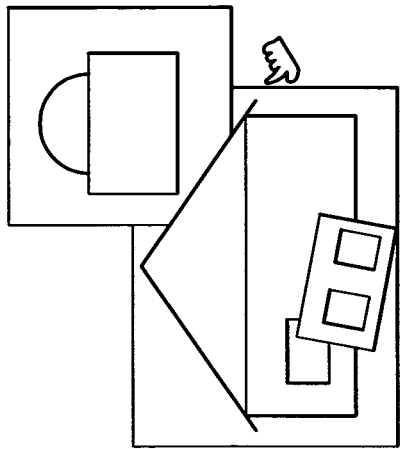
FIGS. 3A to 3D are a series of screen shots of a flipping animation, in accordance with an embodiment of the present invention.
Figure 3D:
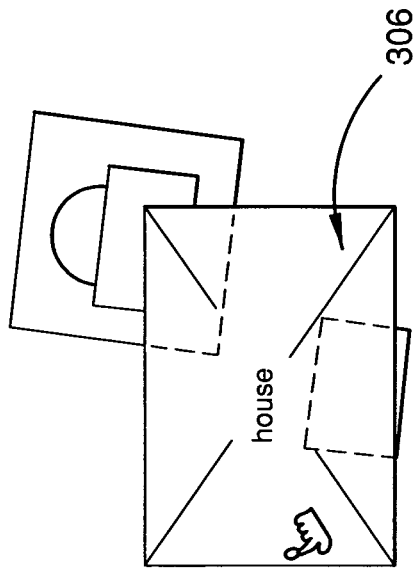
Figure 3A:
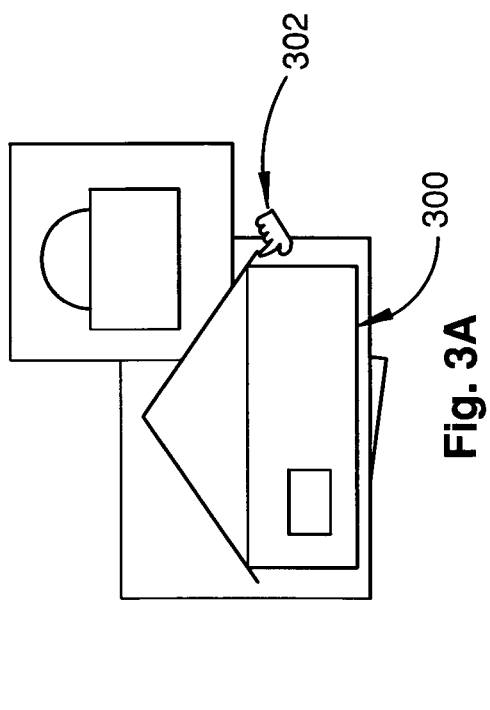
Figure 3C:
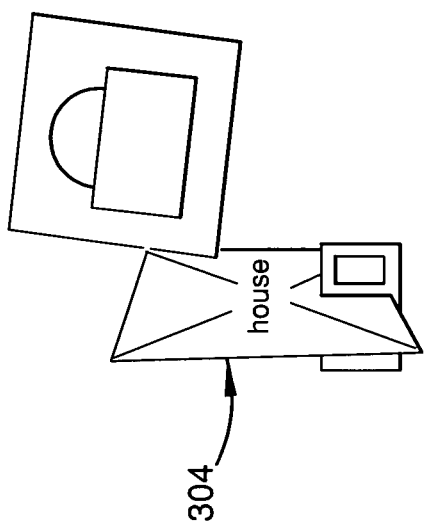

In FIG. 3D, the flipped image is rendered with a semi transparent white colouring 304, although in another embodiment, the rendering can be completed in different graphical details as to portray the image as having been flipped 306. The image once flipped behaves differently when other items on the display are dragged over it. The user may attach various digital data to the image once it is flipped. Such data may include, but not limited to audio files, texts, multimedia files or other digital data. The user can initiate an attachment of digital data by selecting the digital data object and positioning this object over a flipped image. This can be done by either the use of a menu or with a dwell motion when the object is over the flipped image. Once the attachment is made a circle with a number appears on the back of the flipped image.

The user may record pieces of audio objects and attach these objects onto the image, which will be displayed as a circle on the image. The audio links may be deleted by dragging the circle out of the image, thereby breaking this link.

Although the display described above was in the form of a surface displaying a projected image, it will be understood that the display can take any form. For example, the display may take the form of a touch-screen display or may simply be a conventional display where inputs to the display are received by traditional inputs such as a keyboard and mouse.

Although not required, the embodiments described with reference to the Figures can be implemented via an application programming interface (API) or as a series of libraries, for use by a developer, and can be included within another software application, such as a terminal or personal computer operating system or a portable computing device operating system. Generally, as program modules include routines, programs, objects, components, and data files that perform or assist in the performance of particular functions, it will be understood that the functionality of the software application may be distributed across a number of routines, objects and components to achieve the same functionality as the embodiment described and the broader invention claimed herein. Such variations and modifications are within the purview of those skilled in the art.

ANNEXURE 1
Procedure for deciding whether to initiate a flip

```
1   bool Image::flipSelected( ) {
2       GLfloat x = fabsf(currMPos.x), y = fabsf(currMPos.y);
3       return !inBlackhole &&
4           (y − x > RConfig::CORNER_PROP ||
5           x − y > 0.5*aspect − 0.5 + RConfig::CORNER_PROP);
6   }
```

ANNEXURE 2
Procedures for flipping an object, given the current contact position on the screen

```
1   bool Image::flipto(int screen_x, int screen_y) {
2       P3<GLfloat> avgPos;
3       //determine in texture coords where the control point is
4       setObject(avgPos, screen_x, screen_y, true);
5       avgPos.x /= aspect; //normalise between 0 and 1
6       //(we always flip along the bigger direction)
7
8       float cosval, dist;
9       if (!flipping) { //not already flipping
10          xflip = fabs(avgPos.y) > fabs(avgPos.x);
11          dist = xflip ? avgPos.y*2.0 : avgPos.x*2.0;
12          backflip = dist < 0;
13          wasflipped = flipped;
14          flipping = true;
15      } else {
16          dist = xflip ? avgPos.y*2.0 : avgPos.x*2.0;
17      }
18
19      //now the flipping state toggles if the distance has changed in sign
20      flipped = wasflipped != (backflip != dist < 0);
21
22      //determine the angle to rotate the image
23      cosval = fabs(dist);
24      if (cosval < 1.0) {
25          flipangle = acosf(cosval); //between 0 and 90
26
27          //now, if we started on the "wrong" side, we rotate the other
28          //way we also do a magical flip at the centre if flipped
29          if (xflip == backflip)
30              flipangle *= -1.0;
31
32          //now we are here, whenever we have a change from
33          // the start, we want to subtract from 180 degrees
34          if (flipped != wasflipped)
35              flipangle = -flipangle;
36
37      } else {
38          //dist is > 1.0, so touch point moved away - don't flip
39          flipangle = 0.0;
40      }
41
42      pc.makeDirty();
43      return true;
44  }
```

ANNEXURE 3

```
45  void Image::drawPartialFlip() {
46      glPushMatrix();
47      glRotatef(flipangle*RAD2DEG,
48                xflip ? 1.0 : 0.0,
49                xflip ? 0.0 : 1.0,
50                0.0);
51      If (flipped) {
52          drawReverse();
53          //also draw the back if we are flipping
54          if (flipping) {
55              glRotatef(180,
56                        xflip ? 1.0 : 0.0,
57                        xflip ? 0.0 : 1.0,
58                        0.0);
59              glCallList(*model);
60          }
61
62      } else {
63          drawTexture();
64          if (flipping) {
65              glRotatef(180,
66                        xflip ? 1.0 : 0.0,
67                        xflip ? 0.0 : 1.0,
68                        0.0);
69              drawReverse(); /* if rendering ?? */
70          }
71      }
72      glPopMatrix();
73  }
```

ANNEXURE 4
Procedure, called each time an object is moved, to check whether it should be attached to another object

```
1   void Resource::checkLink() {
2       // get the topmost object in the environment at the 'touch' location
3       P3<int> scr(pc.getScreen() + clickPos);
4       PResource top = env->selectTop(scr.x, scr.y, this, true);
5
6       PResource cur = 0; // current parent, if any
7       if (link)
8           cur = link->getParent();
9
10      if (cur != top && canDetach()) { //if changed
11          // remove old dependencies, if any
12          removeDependenciesOnParent();
13
14          if (top && top->isFlipped()) {
15              if (canLink(top) && top->canLink(this)) {
16                  Layout *lay = top->getChildLayout();
17                  /* if new parent has a layout manager, add to that */
18                  if (lay) {
19                      lay->add(this);
20                      lay->layout();
21                      link = lay;
22                  } else { /* else use "basic" linking method */
23                      link = PDAdapter::link(this, top);
24                  }
25                  pushFlasher(top); // give feedback
26              }
27          }
28      }
29  }
```

The invention claimed is:

1. A method for manipulating digital images comprising:
displaying a user interface, the user interface comprising a display arranged to display at least one digital image, the at least one image having a front side and at least one opposing side displayable to a user, the front and each one of the opposing sides having at least one detection portion, wherein the detection portion is arranged to detect a manipulation request by the user;
on detection of the request, initiating a routine whereby a displayed side is at least partially rotated from view and the at least one opposing side is at least partially displayed, wherein:
the at least one detection portion is a defined portion of the front side, and
a digital file that is dragged over the at least one opposing side is attachable to the image, but only after the rotation;
receiving an attachment request to attach the digital file to the at least one image, wherein the attachment request comprises a user input of positioning the digital file over the at least one opposing side of the at least one image and attaching the digital file to the at least one opposing side of the at least one image in dependence on the at least one image having been rotated and the at least one opposing side being displayed;

receiving an execution request to execute the attached digital file; and executing the attached file in dependence on the at least one image having been rotated.

2. A method for manipulating digital images comprising:
displaying a user interface, the user interface comprising a display arranged to display at least one digital image, the at least one image having a front side and at least one opposing side displayable to a user, the front side and each one of the opposing sides having at least one detection portion, wherein the detection portion is arranged to detect a manipulation request by the user;
on detection of the manipulation request, initiating a routine whereby a displayed side is represented to at least partially rotate from view, and at least one opposing side is at least partially displayed, wherein the different sides of the image have different interaction behaviours with other digital items wherein a digital file that is dragged over the at least one opposing side is attachable to the image, but only after the rotation;
receiving an attachment request to attach a digital file to the at least one digital image, wherein the attachment request comprises a user input of positioning the digital file over the at least one opposing side of the at least one image and attaching the digital file in dependence on the at least one image having been rotated and the at least one opposing side being displayed;
receiving a execution request to execute the attached digital file; and
executing the attached file in dependence on the at least one image having been rotated.

3. A method according to claim 2, wherein rotation occurs only if the manipulation request is sustained by the user during the execution of the routine.

4. A method according to claim 2, wherein the routine provides feedback to the user during the execution of the routine.

5. A method according to claim 4, wherein the feedback is an animation of the rotation of the at least one image.

6. A method according to claim 5, wherein the animation depicts the rotation of the at least one image on an axis that is perpendicular to the display.

7. A method according to claim 2, wherein the manipulation request comprises a user input including one or more of a hand gesture and movement of a stylus, pen or electronic peripheral input to the user interface.

8. A method according to claim 7, wherein the manipulation request is a rotation movement performed by the user.

9. A method according to claim 2, wherein each one of the opposing sides may display a representation of a digital object.

10. A method according to claim 9, wherein the digital object is an audio file.

11. A method according to claim 10, wherein the representation is an icon associated with the digital object.

12. A method according to claim 11 wherein the initial direction of rotation is determined in dependence on the manipulation request.

13. A system for manipulating digital images comprising a computer unit, the computer unit implementing a user interface according to claim 2.

14. One or more storage device having stored thereon computer-executable instructions, which, when executed by at least one processor, implement the method of claim 2.

15. A method according to claim 2 wherein the initial direction of rotation is determined in dependence on the manipulation request.

16. A method according to claim 2 wherein the opposing side is rendered to portray the image as having been rotated.

17. A method according to claim 2 wherein the opposing side is rendered with semi-transparent white coloring.

18. A method for manipulating digital images comprising the steps of:
displaying at least one digital image on a display;
rendering the at least one image to have a front side and at least one opposing side;
displaying the front side on the display;
placing at least one detection portion on the front side and each one of the opposing sides;
detecting a manipulation request by a user with the detection portion;
on detection of the manipulation request, initiating a routine whereby a displayed side is at least partially rotated from view and the at least one opposing side is at least partially displayed, wherein:
the detection portion is a defined portion of the front side, and
a digital file that is dragged over the at least one opposing side is attachable to the image, but only after the rotation;
receiving an attachment request to attach the digital file to the at least one image wherein the attachment request comprises a user input of positioning the digital file over the image and attaching the digital file to the at least one opposing side of the at least one image in dependence on the at least one image having been rotated and at least one opposing side being displayed;
receiving an execution request to execute the attached digital file; and
executing the attached file in dependence on the at least one image having been rotated.

19. A method for manipulating digital images comprising:
displaying a user interface, the user interface comprising a display arranged to display at least one digital image, the at least one image having a front side and at least one opposing side displayable to a user, the front side and each one of the opposing sides having at least one detection portion, wherein the detection portion is arranged to detect a manipulation request by the user;
on detection of the request, initiating a routine whereby a displayed side is represented to at least partially rotate from view, and the at least one opposing side is at least partially displayed, wherein the manipulation request is a rotation movement performed by the user wherein a digital file that is dragged over the at least one opposing side is attachable to the image, but only after the rotation;
receiving an attachment request to attach a digital file to the at least one image, wherein the attachment request comprises a user input of positioning the digital file over the at least one opposing side of the at least one image and attaching the digital file to the at least one opposing side of the at least one image in dependence on the at least one image having been rotated and the at least one opposing side being displayed; and
receiving an execution request to execute the attached digital file; and
executing the attached file in dependence on the at least one image having been rotated.

20. A method for manipulating digital images comprising the steps of:
displaying at least one digital image on a display;
rendering the at least one image to have a front side and at least one opposing side;
displaying the front side on the display;

placing at least one detection portion on the front side and each one of the opposing sides;

detecting a manipulation request by the user with the detection portion;

on detection of the request, initiating a routine whereby a displayed side is represented to at least partially rotate from view, and at least one opposing side is at least partially displayed, wherein the manipulation request is a rotation movement performed by the user, wherein a digital file that is dragged over the at least one opposing side is attachable to the image, but only after the rotation;

receiving an attachment request to attach a digital file to the at least one image, wherein the attachment request comprises a user input of positioning the digital file over the at least one opposing side of the at least one image and attaching the digital file to the at least one opposing side of the at least one image in dependence on the at least one image having been rotated and at least one opposing side being displayed;

receiving an execution request to execute the attached digital file; and executing the attached file in dependence on the at least one image having been rotated.

21. A method for manipulating digital images comprising the steps of:

displaying at least one digital image on a display;

rendering the at least one image to have a front side and at least one opposing side;

displaying the front side on the display;

placing at least one detection portion on the front side and each one of the opposing sides;

detecting a manipulation request by the user with the detection portion;

on detection of the manipulation request, initiating a routine whereby a displayed side is represented to at least partially rotate from view, and at least one opposing side is at least partially displayed, wherein the different sides of the image have different interaction behaviours with other digital items, wherein a digital file that is dragged over the at least one opposing side is attachable to the image, but only after the rotation;

receiving an attachment request to attach the digital file to the at least one image, wherein the attachment request comprises a user input of positioning the digital file over the at least one opposing side of the at least one image and attaching the digital file to the at least one opposing side of the at least one image in dependence on the at least one image having been rotated and the at least one opposing side being displayed;

receiving an execution request to execute the attached digital file; and executing the attached file in dependence on the at least one image having been rotated.

22. A method according to claim 21, wherein rotation occurs only if the manipulation request is sustained by the user during the execution of the routine.

23. A method according to claim 21, wherein feedback is provided by the routine to the user during the execution of the routine.

24. A method according to claim 23, wherein the feedback is an animation of the rotation of the at least one image.

25. A method according to claim 24, wherein the animation depicts the rotation of the at least one image on an axis that is perpendicular to the display.

26. A method according to claim 21, wherein the manipulation request comprises a user input including one or more of a hand gesture and movement of a stylus, pen or electronic peripheral input to the user interface.

27. A method according to claim 26, wherein the manipulation request is initiated by a rotation movement performed by the user input.

28. A method according to claim 21, wherein each one of the opposing sides may display a representation of a digital object.

29. A method according to claim 28, wherein the digital object is an audio file.

30. A method according to claim 29, wherein the digital object is an image file.

31. A method according to claim 29, wherein the representation is an icon associated with the digital object.

32. One or more storage device having stored thereon computer-executable instructions, which, when executed by at least one processor, implement the method of claim 21.

33. A method according to claim 21 wherein the opposing side is rendered to portray the image as having been rotated.

34. A method according to claim 21 wherein the opposing side is rendered with semi-transparent white coloring.

* * * * *